United States Patent
Toda et al.

(10) Patent No.: US 7,484,894 B2
(45) Date of Patent: Feb. 3, 2009

(54) TAPERED ROLLER BEARING AN AUTOMOTIVE PINION SHAFT SUPPORTING APPARATUS UTILIZING SAME TAPERED ROLLER BEARING

(75) Inventors: Kazutoshi Toda, Tondabayashi (JP); Kouji Kawaguchi, Izumi (JP); Hiroyuki Ohshima, Kashihara (JP); Naoki Masuda, Nara (JP); Hiroki Matsuyama, Nara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 345 days.

(21) Appl. No.: 11/504,757

(22) Filed: Aug. 16, 2006

(65) Prior Publication Data

US 2007/0127860 A1 Jun. 7, 2007

(30) Foreign Application Priority Data

Aug. 18, 2005 (JP) ............... P2005-237719

(51) Int. Cl.
*F16C 33/36* (2006.01)
(52) U.S. Cl. ........................ 384/571; 384/450
(58) Field of Classification Search ............... 384/450, 384/568, 571
See application file for complete search history.

(56) References Cited

U.S. PATENT DOCUMENTS

| 5,007,747 | A | * | 4/1991 | Takeuchi et al. | ............ 384/450 |
| 6,447,168 | B2 | * | 9/2002 | Tsujimoto et al. | ............ 384/450 |
| 6,502,996 | B2 | * | 1/2003 | Joki | ............ 384/571 |

FOREIGN PATENT DOCUMENTS

| JP | 2-115344 | 4/1990 |
| JP | 3-113 | 1/1991 |
| JP | 3-12015 | 2/1991 |
| JP | 4-95318 | 8/1992 |
| JP | 5-271779 | 10/1993 |
| JP | 7-76764 | 3/1996 |
| JP | 2001-65574 | 3/2001 |
| JP | 2003-130059 | 5/2003 |
| WO | WO 2005/080813 | 9/2005 |
| WO | WO 2005/100809 | 10/2005 |

* cited by examiner

*Primary Examiner*—Thomas R Hannon
(74) *Attorney, Agent, or Firm*—McGinn IP Law Group, PLLC

(57) ABSTRACT

A tapered roller bearing according to the invention is such that the surface hardnesses of a raceway surface of an inner ring and rolling contact surfaces of tapered rollers are set to 63 to 69HRC. In addition, respective raceway surfaces of an outer ring and the inner ring and the rolling contact surfaces of the tapered rollers are crowned and are set such that a total crowning amount is 50 μm or larger, an outer crowning rate is 40% or larger and a roller crowning rate is 20% or smaller.

4 Claims, 14 Drawing Sheets

TAPERED ROLLER BEARING AN AUTOMOTIVE PINION SHAFT SUPPORTING APPARATUS UTILIZING SAME TAPERED ROLLER BEARING

BACKGROUND OF THE INVENTION

The present invention relates to a tapered roller bearing which is preferably used in an automotive pinion shaft supporting apparatus as in a differential and a transaxle and in a transmission of a vehicle or the like, and an automotive pinion shaft supporting apparatus which uses the tapered roller bearing.

In recent years, there has been increasing a demand for improvement in fuel economy of motor vehicles, and in association with the demand, there is expressed a desire to reduce the running torque of tapered roller bearings which are used to support rotational shafts of transmissions and differentials installed on those motor vehicles.

In these situations, as a method of reducing the running torque of a tapered roller bearing, there is a method of reducing the rolling friction of a tapered roller bearing by crowning rolling contact surfaces of tapered rollers and raceway surfaces of inner and outer rings.

As the method like this, as is described in Patent Document No. 1 below, there is proposed, for example, a method in which raceway surfaces are crowned in an arc-shape fashion so as to realize a reduction in running torque, or, as is described in Patent Document No. 2 below, there is also proposed a method in which rolling contact surfaces of rollers and raceway surfaces which are brought into contact therewith are crowned to a shape which approximates to a logarithmic curve.

In the conventional examples, the performance of the tapered roller bearing was attempted to be enhanced by specifying the shape of the crown imparted to the raceway surface or the rolling contact surface by a numerical value. However, there had been no attempt to grasp the crown as quantity so as to specify the crowning amount so imparted to thereby reduce the running torque of the tapered roller bearing.

Patent Document No. 1: JP-A-2003-130059
Patent Document No. 2: JP-A-2001-65574

Incidentally, by crowning the rolling contact surface or the raceway surface as described above, the running torque of the tapered roller bearing can be reduced but the contact pressure between the rolling contact surface and the raceway surfaces may be increased due to the bearing dimension and used condition. Therefore, the generation of abrasion of the contact surface and surface flaking become significant, thereby the life of the tapered roller bearing may be shorten. Due to this, there is a case that the main dimensions of the tapered roller bearing have to be relatively large in order to decrease the contact pressure, which leads a problem that further lowering torque and further downscaling are inhibited.

Especially, if the contact pressure between the rolling contact surface and the raceway surfaces is high, the generation of the surface flaking of the contact surface is accelerated due to the foreign matters such as abrasive powder of the gear being interposed between the rolling contact surface and the raceway surfaces, thereby a reduction in life of the tapered roller bearing becomes significant.

SUMMARY OF THE INVENTION

The invention is made in view of the situations, an object there of is to provide a tapered roller bearing which can reduce running torque by specifying, as quantity, crowning applied to rolling contact surfaces of tapered rollers and raceway surfaces of inner and outer rings and suppress the reduction in bearing life even in the case that the contact pressure of the contact surface between the rolling contact surface and the raceway surfaces, and an automotive pinion shaft supporting apparatus which utilizes the tapered roller bearing so provided.

According to the present invention, there is provided a tapered roller bearing comprising inner and outer rings which are made of a steel material, a plurality of tapered rollers which are interposed between the inner and outer rings and are made of a steel material, and a cage for the tapered rollers, the inner and outer rings and the tapered rollers having raceway surfaces and rolling contact surfaces, respectively, which are crowned, wherein surface hardnesses of the raceway surface of the inner ring and the rolling contact surfaces of the tapered rollers are 63 to 69HRC, respectively, a total crowning amount (=outer ring crowning amount+inner ring crowning amount+roller crowning amount×2) is 50 μm or larger, an outer ring crowning rate (=outer ring crowning amount/total crowning amount) is 40% or larger, and a roller crowning rate (=(roller crowning amount×2)/total crowning amount) is 20% or smaller.

According to the tapered roller bearing that is configured as is described above, since the total crowning amount of crownings applied to the rolling contact surfaces and the raceway surfaces, the outer ring crowning rate and the roller crowning rate are set to the preferred values, contact areas on the individual rolling contact surfaces and the raceway surfaces can be reduced properly, and the rolling viscous resistance between the inner and outer rings and the tapered rollers can be reduced, whereby the running torque can be reduced.

Furthermore, according to the tapered roller bearing, since the surface hardnesses of the rolling contact surfaces of the tapered rollers and the raceway surface of the inner ring are set to the preferred values, even in the event that a contact bearing pressure between the rolling contact surfaces and the raceway surface results in a high bearing pressure, the generation of surface flaking in those surfaces can be suppressed.

In the tapered roller bearing, a surface retained austenite amount in the raceway surface of the inner ring is preferably 13 wt % or larger and smaller than 25 wt %. In the event that the surface retained austenite amount is 25 wt % or larger, there occur risks that the bearing life of the tapered roller bearing varies and that a surface flaking is generated in the tapered rollers and the inner ring raceway surface.

By setting the surface retained austenite amount in the inner ring raceway surface in the way described above, the variation in the life of the tapered roller bearing can be suppressed, and the generation of surface flaking in the tapered rollers and the inner ring raceway surface can be suppressed effectively.

In the tapered roller bearing, carburizing and quenching treatments are preferably applied to the inner ring.

In this case, a core portion of the inner ring can be given a low hardness compared to the surface thereof, while the surface of the inner ring is made to have the aforesaid relatively high hardness, whereby the toughness of the inner ring as a whole can be secured.

In addition, according to the invention, there is provided an automotive pinion shaft supporting apparatus having a pinion shaft and rolling bearings which are disposed on a pinion gear side and an opposite side thereto of the pinion shaft to support the pinion shaft, respectively, wherein at least one of the rolling bearings which are disposed on the pinion gear side and the opposite side thereto of the pinion shaft, respectively, is made up of the aforesaid tapered roller bearing.

According to the automotive pinion shaft supporting apparatus, as is described above, since the contact areas on the individual rolling contact surfaces and the raceway surfaces can be reduced properly, and the rolling viscous resistance between the inner and outer rings and the tapered rollers can be reduced, whereby the running torque can be reduced, the rotation loss of the apparatus can be reduced. In addition, even in the event that a contact bearing pressure between the rolling contact surfaces and the raceway surface results in a high bearing pressure, the generation of surface flaking in those surfaces can be suppressed, so as to suppress a reduction in bearing life. Thus, the life of the automotive pinion shaft supporting apparatus can be extended.

According to the tapered roller bearing and the automotive pinion shaft supporting apparatus of the invention, since the contact areas on the rolling contact surfaces and the raceway surfaces can be reduced properly and the rolling viscous resistance between the inner and outer rings and the tapered rollers can be reduced, the running torque can be reduced. In addition, since the generation of surface flaking in the rolling contact surfaces and the raceway surfaces can be suppressed, even in the event that the contact bearing pressure between the rolling contact surfaces and the raceway surface results in a high bearing pressure in association with the application of the crownings to the rolling contact surfaces and the raceway surfaces, the reduction in bearing life can be suppressed.

BRIEF DESCRIPTION OF THE DRAWINGS

FIGS. 6A and 6B are diagrams showing the shape of a crowning (a composite crowning) on an inner ring, in which FIG. 6A shows a contour of the inner ring, and FIG. 6B shows exemplarily the shape of the crowning which is applied to a raceway surface of the inner ring.

FIGS. 7A and 7B are diagrams showing the shape of a crowning (a full crowning) on the inner ring, in which FIG. 7A shows a contour of the inner ring, and FIG. 7B shows exemplarily the shape of the crowning which is applied to the raceway surface of the inner ring.

FIGS. 8A and 8B are diagrams showing the shape of a crowning on a tapered roller, in which FIG. 8A shows a contour of an upper half of an axial section of a tapered roller 30, and FIG. 8B shows exemplarily the shape of the crowning which is applied to a rolling contact surface of the tapered roller.

FIGS. 9A and 9B are diagrams showing the shape of a crowning on an outer ring, in which FIG. 9A shows a contour of the outer ring, and FIG. 9B shows exemplarily the shape of the crowning which is applied to a raceway surface of the outer ring.

DETAILED DESCRIPTION OF PREFERRED EMBODIMENTS

Figure 1:
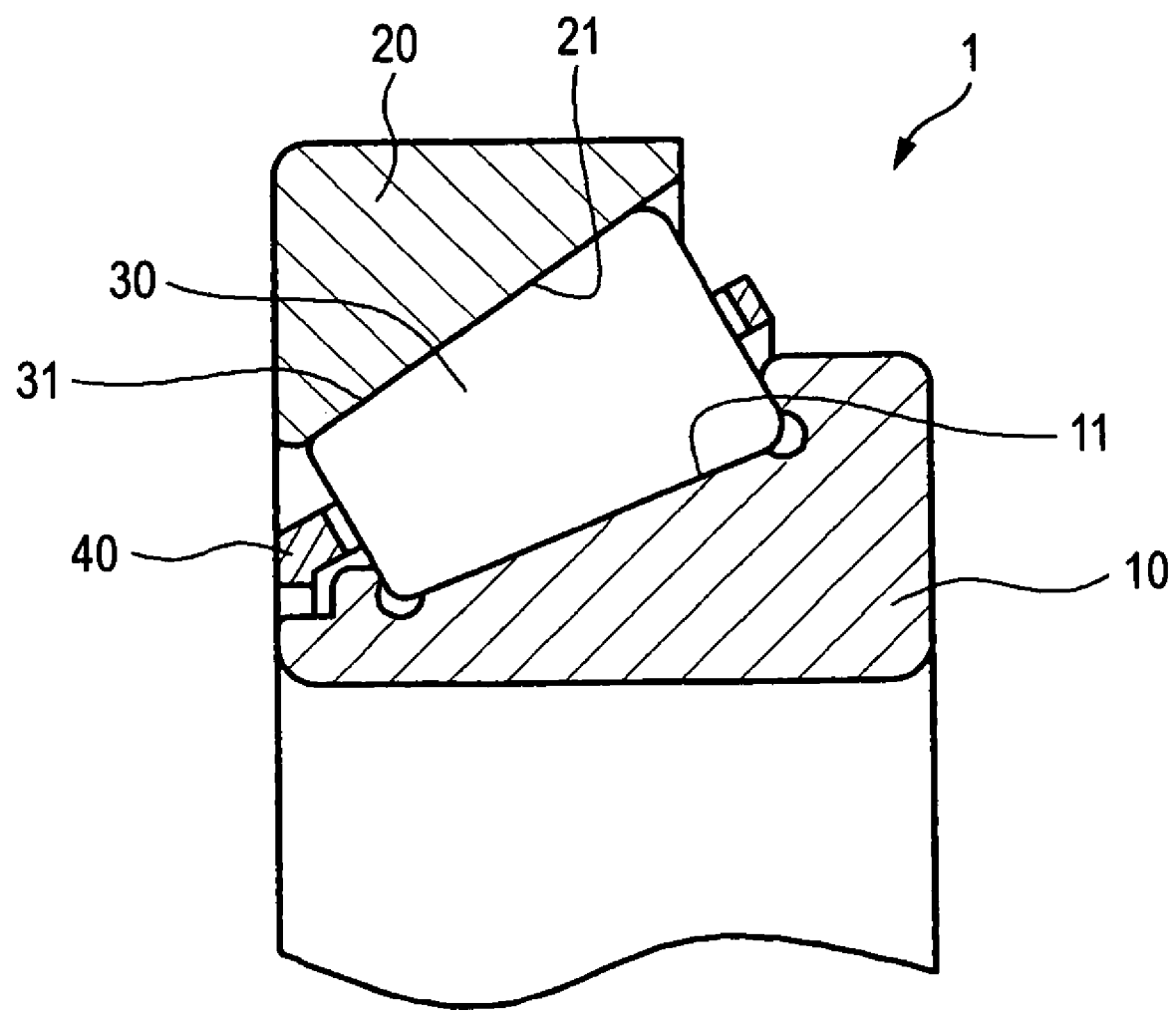
FIG. 1 is an axial sectional view of a tapered roller bearing according to an embodiment of the invention.

Next, referring to the accompanying drawings, a preferred embodiment of the invention will be described below. FIG. 1 is an axial sectional view of a tapered roller bearing according to an embodiment of the invention.

In the figure, a tapered roller bearing 1 according to an embodiment of the invention includes an inner ring 10 having an inner ring raceway surface 11 made up of a coned surface on an outer circumference thereof, an outer ring 20 having an outer ring raceway surface 21 made up of a coned surface on an inner circumference thereof, a plurality of tapered rollers 30 each having a rolling contact surface 31 made up of a coned surface on an outer circumference thereof and interposed between both the raceway surfaces 11, 21 in such a manner as to freely roll therebetween, and a cage 40 for retaining the plurality of tapered rollers 30 circumferentially at predetermined intervals.

The tapered roller 30 is made up of, for example, a bearing steel such as those prepared to, for example, SUJ2 and SAE52100 and is given a predetermined heat treatment so as to be given a surface hardness of 63 to 69HRC of the rolling contact surface 31. Further, the inner and outer rings 10, 20 are made up of a case hardened steel prepared to, for example, SCr420 and SAE5210 and are treated to have a surface hardness of 63 to 69HRC of the raceway surfaces 11, 21, and a surface retained austenite amount of 13 wt % or larger and smaller than 25 wt %.

In the event that lower limit values for the surface hardnesses of the inner ring 10 and the tapered roller 30 are. 63HRC, the reduction in life of the tapered roller bearing 1 can be suppressed when this tapered roller bearing 1 is used in a lubricant which contains minute foreign matters resulting from the wear of the bearing. This was found out from the result of the following experiment.

Figure 2:
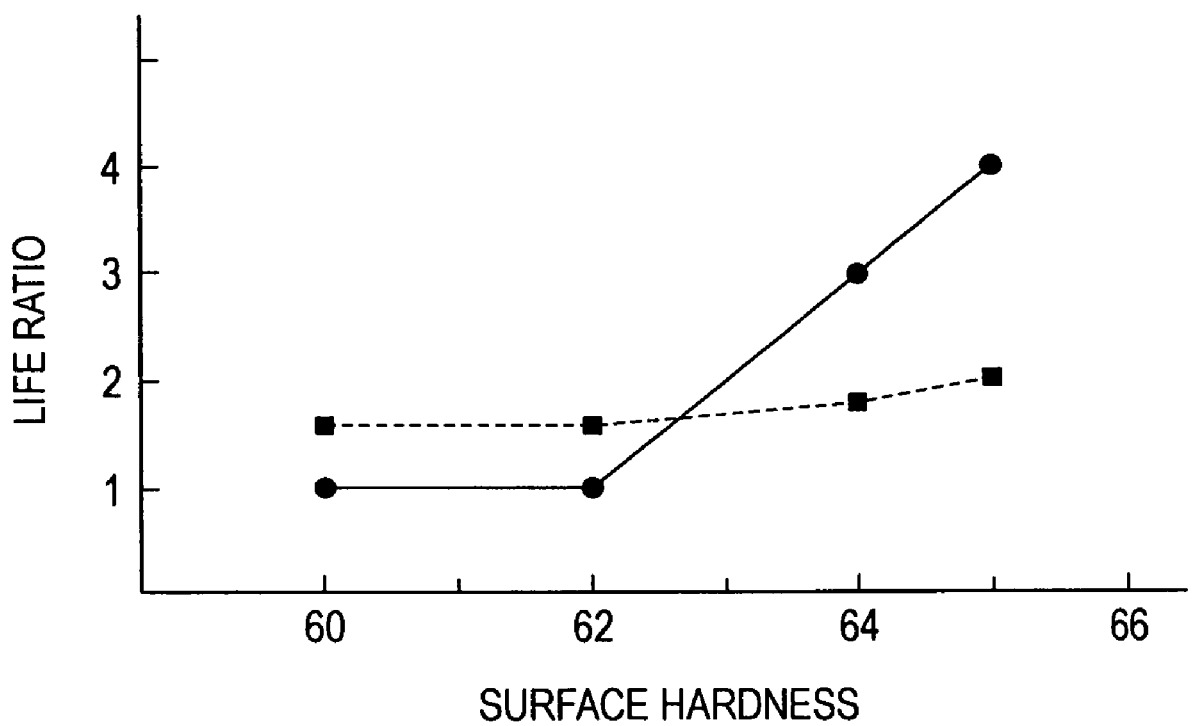
FIG. 2 is a graph showing a relationship between a surface hardness and a life ratio of an inner ring.

Namely, a life test of the tapered roller bearing was carried out in a gear oil having a viscosity of 85W-90 which contained, as foreign matters, 0.03 wt % of quenched steel powder whose surface hardness and particle size were 62HRC and 150 µm or smaller, respectively, and a relationship between the surface hardness and life ratio (life/a predetermined value) of the inner ring 10 was grasped during the experiment. The results of the experiment so carried out are shown in FIG. 2. Note that the outer ring and the tapered rollers were used in this experiment which fulfilled the aforesaid conditions and which were set to have substantially the same specifications. In addition, the bearing pressure between the raceway surface 11 of the inner ring 10 and the rolling contact surface 31 was set in two ways to about 1.9 GPa and 2.0 GPa, and this bearing was tested with these two set values.

In the figure, a solid line indicates the result of the test with the bearing pressure being 2.0 GPa, while a broken line indicates the result of the test with the bearing pressure being 1.9

GPa. As is clear from the figure, with the bearing pressure being 2.0 GPa, when the surface hardness exceeds 62HRC, the life ratio increases remarkably. In addition, also with the bearing pressure being 1.9 GPa, when the surface hardness exceeds 62HRC, the life ratio increases although the increase is small.

Consequently, by making the surface hardness of the inner ring 10 be 63HRC or larger, the life of the tapered roller bearing 1 is extended.

In addition, when attention is drawn to the difference in bearing pressure, the bearing pressure of 2.0 GPa achieves a greater effect to increase the life ratio than the bearing pressure of 1.9 GPa, and it is seen that making the surface hardness of the inner ring 10 be 63HRC or larger is effective particularly in a high bearing pressure environment.

As in the experiment carried out in the way described above, when the tapered roller bearing is used in a lubricant which contains hard foreign matters, the foreign matters are interposed between the raceway surfaces and the rolling contact surfaces, and the foreign matters so interposed cause indentations on the raceway surfaces. Indentations caused by such hard foreign matters themselves constitute a cause for surface flaking and cause a risk that raised portions formed on the peripheries of the indentations cause a surface flaking in the rolling contact surfaces 31 of the tapered rollers 30.

It is understood that the generation of indentations on the raceway surface and the rolling contact surfaces of the inner ring 10 and the tapered rollers 30 by the foreign matters is suppressed by making the surface hardnesses of the inner ring 10 and the tapered rollers 30 be 63HRC or larger. Consequently, the generation of surface flaking in the raceway surface can be suppressed by so setting the hardnesses of the inner ring 10 and the tapered rollers 30, and hence, the reduction in life of the tapered roller bearing can be suppressed.

The reason the surface retained austenite amount of the inner ring 10 is made to be less than 25 wt % was found out from the results of the following experiment.

Figure 3:
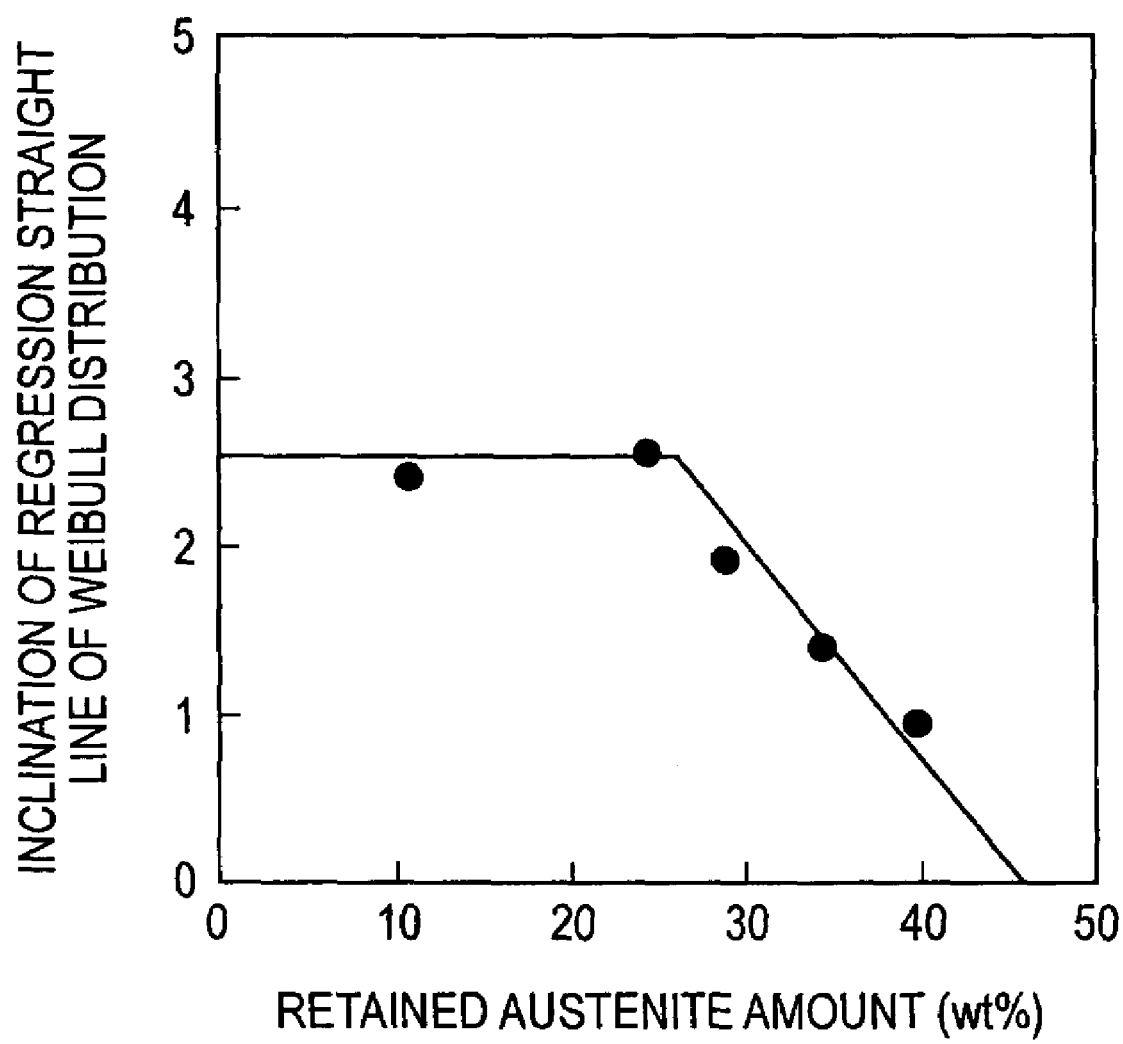
FIG. 3 is a graph showing a relationship between the inclination of a regression straight line of a Weibull distribution when life data obtained by a life test of the tapered roller bearing are plotted on a Weibull probability paper and a surface retained austenite amount therein.

Namely, life tests were carried out on a number of tapered roller bearings which had inner rings 10 set so as to have different surface retained austenite amounts, and life data obtained by the tests were plotted on a Weibull probability paper, so as to obtain an inclination of a regression straight line of Weibull distribution. The results of an investigation are shown in FIG. 3 which was carried out to investigate a relationship between the inclination so obtained and the surface retained austenite amount (γR).

According to the figure, when the surface retained austenite amount reaches and exceeds 25 wt %, the value of the inclination decreases drastically, and it is seen from this that the degree at which the bearing life varies increases. The increase in degree of the bearing life variation like this is not good from the view point of product quality. Due to this, it is proper that the surface retained austenite amount of the inner ring 10 is set to be less than 25 wt %.

Figure 4:
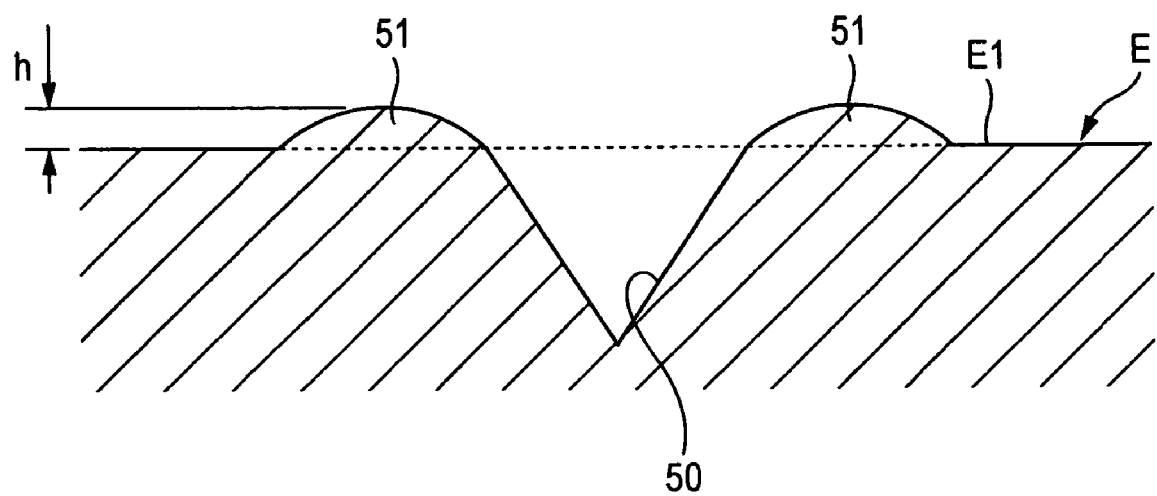
FIG. 4 is an exemplary diagram showing a section of an indentation.

Furthermore, the following experiment was carried out. Namely, firstly, two steel discs were prepared which were adjusted to a predetermined surface hardness, and a plurality of indentations were formed on concentric circles on a surface of one of the discs by means of a Vickers penetrator. An exemplary diagram of a section of an indentation so formed is shown in FIG. 4. An indentation 50 formed on the surface E1 of the disc E is formed by forcing the Vickers penetrator relative to the surface E1 under a constant load. As this occurs, as shown in the figure, a raised portion 51 is formed on the periphery of the indentation 50 in such a manner as to be raised from the surface E1.

Then, a plurality of steel ball were interposed between the two discs on one of which the indentations 50 are formed, and the two discs were rotated relatively while a thrust load was being applied to both the discs, so that the plurality of balls rotated on the concentric circles where the indentations 50 were formed. By doing like this, the balls were made to pass over the raised portions 51 to apply stress to the raised portions 51, so as to grasp a relationship between the height h of the raised portions 51 and the number of times of applications of stress by the balls.

Figure 5:
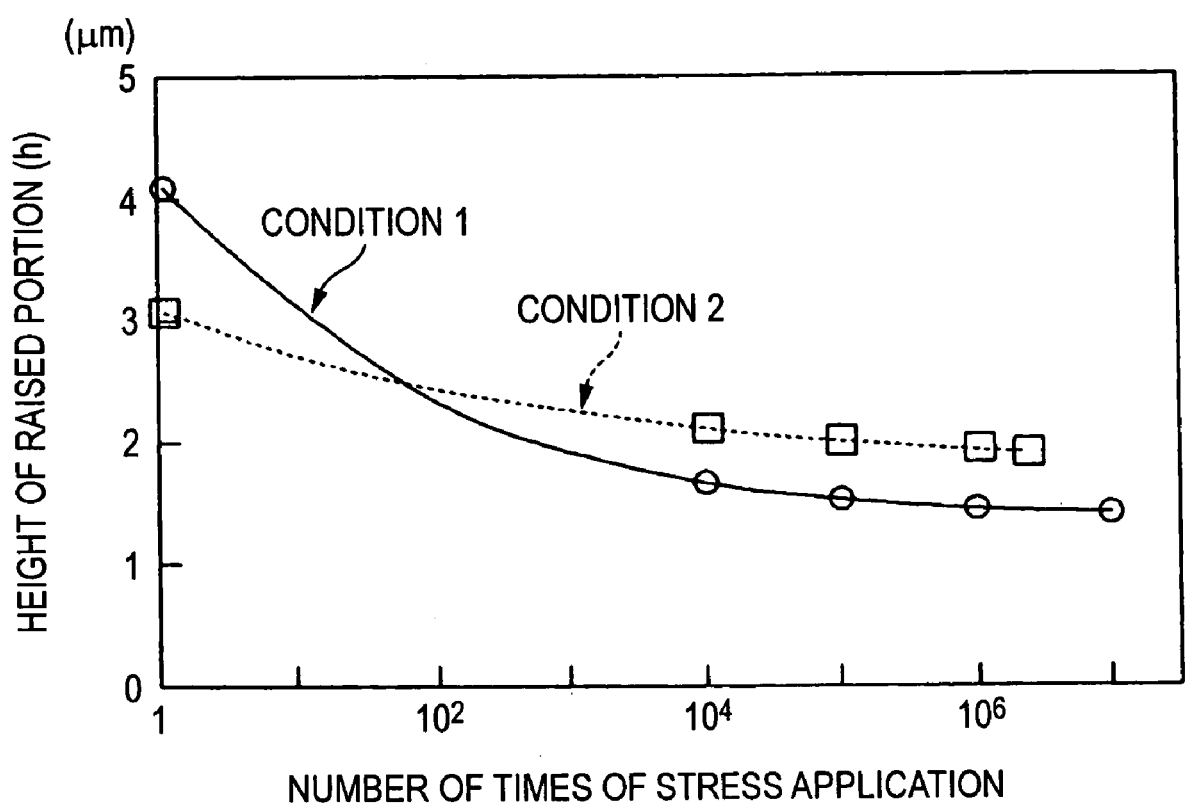
FIG. 5 is a graph showing a relationship between the height of a raised portion and the number of stress applications.

The results of the experiment are shown in FIG. 5. Note that in FIG. 5, a solid line indicates the result of a test carried out under a condition 1 (the surface hardness of the discs was 62.2HRC, the surface retained austenite amount was 16.9 wt %) and a broken line indicates the result of a test carried out under a condition 2 (the surface hardness of the discs was 62.9HRC, the surface retained austenite amount was 31.5 wt %).

In FIG. 5, under the condition 1, the height h of the raised portions 51 gradually decreases as the number of times of stress applications increases, but in the case of the condition 2, compared to the condition 1, the height h of the raised portions 51 does not decrease after it has decreased to some extent even in the event that the number of stress applications increases, and it is seen from this that the height h of the raised portions 51 does not decrease much with the high surface retained austenite amount, and the raised portions 51 are maintained relatively high in height.

A cause for this is considered to be that when the stress is applied to the raised portions 51, the raised portions 51 are collapsed by the stress so applied thereto in such a manner that the height thereof is reduced, but with the high surface retained austenite amount, a processing hardening tends to be brought about when the raised portions 51 are collapsed, and as a result, the hardness of the raised portions 51 is increased, whereby even in the event that the stress is applied thereto, the height of the raised portions 51 does not decrease further after it has decreased to some extent. On the contrary, with the low surface retained austenite amount, even in the event that the raised portions 51 are subjected to the stress and are collapsed, the processing hardening is difficult to be brought about, and therefore, the height h of the raised portions 51 decreases when the raised portions 51 continue to be subjected to the stress.

Namely, it can be said from the results of the experiment that with the high surface retained austenite amount, the raised portions 51 are made easy to continue to remain raised. In addition, as is described above, in the tapered roller bearing, in the event that the foreign matters are interposed between the raceway surfaces and the rolling contact surfaces and indentations are formed on the raceway surfaces due to the foreign matters being pressed thereagainst to thereby produce raised portions on the peripheries of the indentations so formed, there is caused a risk that a surface flaking is caused in the rolling contact surfaces 31 of the tapered rollers 30. Consequently, even in the event that raised portions 51 are formed due to a low surface retained austenite amount, the raised portions 51 are made difficult to remain raised, thereby making it possible to suppress the generation of a surface flaking in the rolling contact surfaces 31.

Thus, from the results of the experiments shown in FIGS. 2 and 5, the surface retained austenite amount of the inner ring 10 is preferably made to be less than 25 wt %, and by making this happen, the variation in life of the tapered roller bearing can be suppressed, and the generation of surface flaking in the tapered rollers and the inner ring raceway surface can be suppressed more effectively, thereby making it possible to suppress effectively the reduction in life of the tapered roller bearing.

The inner ring 10 is manufactured through the steps of preparing a material into a predetermined shape using a case hardened steel, giving a carburizing and quenching treatment to the material so prepared, thereafter giving a sub-zero treatment to the material after a pre-tempering treatment has been applied thereto, and giving a proper tempering to the material.

The carburizing and quenching treatment is given by holding the material at a temperature of 900 to 950° C. for a predetermined period of time. After the carburizing and quenching treatment, a surface hardness of 55 to 65HRC and a retained austenite amount of the order of 30 to 65 wt % are provided. The pre-tempering is given by holding the material at a temperature of 100 to 130° C. for longer than 1 hour. The sub-zero treatment is carried out by holding the material at a temperature of −50 to −100° C. for longer than 1 hour. After the sub-zero treatment, a surface hardness of 63 to 69HRC and a retained austenite amount of the order of 13 to 25 wt % are provided.

The inner ring 10 can also be manufactured in the following manner. Namely, the inner ring 10 is manufactured through the steps of giving a secondary quenching treatment to the material after the same carburizing and quenching treatment as that given above is given thereto, and giving a proper tempering treatment to the material after the same pre-tempering and sub-zero treatments as those given above are given thereto. The secondary quenching is given by implementing a quenching by cooling the material, for example, using oil after the material is held heated to 800 to 850° C. for 0.5 hour.

The proper tempering is given by holding the material at a temperature of 140 to 175° C. for longer than 2 hours.

According to these methods, the desired retained austenite amount can be obtained. Namely, in the event that the sub-zero treatment is given out without giving the pre-tempering treatment, austenite tends to be easily degraded to martensite, and the amount of retained austenite is reduced. However, when giving a pre-tempering, austenite retained after the carburizing and quenching treatment has been given is stabilized, and even in the event that the sub-zero treatment is given thereto, the retained austenite is made difficult to be degraded to martensite.

Note that in the aforesaid method, by adjusting properly the treatment temperature of the sub-zero treatment, there may occur a case where there is no need to give the pre-tempering treatment.

Furthermore, the inner ring 10 can also be manufactured in the following manner. Namely, the inner ring 10 is manufactured through the steps of giving a secondary quenching to the material after the same carburizing and quenching treatment as that given above is given thereto, and giving to the material further the same proper tempering as that given above. In the case of this method, the secondary quenching is given by a press tempering process in which the material is held on a press to be quenched after the material is heated to 900 to 950° C. In addition, this secondary quenching can be given by quenching the material by cooling it using oil after the material is heated to 800 to 850° and is held at the temperature for 0.5 hour or longer. A surface hardness of 63 to 69HRC and a surface retained austenite amount of the order of 13 to 25 wt % are provided after the secondary tempering.

According to this method, by giving the secondary quenching prior to the proper tempering, the retained austenite can be stabilized, and the hardness thereof can be increased.

In the inner ring 10, by giving the heat treatment including the aforesaid carburizing and quenching treatment to the material thereof, the surface of the inner ring becomes high in carbon concentration, and the aforesaid relatively high hardness is realized in the surface. However, in a core portion of the inner ring 10, the original carbon concentration of the material is substantially maintained, and the core portion is quenched at a relatively low temperature. Therefore, a hardness of 45HRC or lower is provided as the hardness of the core portion, which is relatively low compared to the hardness resulting in the vicinity of the surface, whereby a high toughness can be secured for the inner ring 10 as a whole, and the shock resistance can be enhanced.

Furthermore, for example, when the tapered roller bearing 1 is applied to an automotive part or the like, vibrations produced when a vehicle runs are transmitted to the tapered roller bearing 1, and the vibrations are then applied to the tapered roller bearing 1 as repeated stress, leading to a risk that the bearing life of the tapered roller bearing is reduced.

In such a case, according to the tapered roller bearing of the embodiment of the invention, since the aforesaid high toughness is secured, the repeated stress can be permitted, and the reduction in life of the tapered roller bearing can be suppressed.

After the tapered roller 20 has been formed into a predetermined shape using the aforesaid bearing steel or the like, the tapered roller 30 is fabricated through the steps of giving an ordinary quenching in which the material is held to be quenched at a temperature of 800 to 850° C. for 0.5 hour or longer, giving a sub-zero treatment in which the material is held at a temperature of −50 to −80° C. for 1 hour or longer and thereafter cooling the material by air, and giving a tempering treatment in which the material is held at a temperature of 140 to 180° C. for 2 hours or longer and thereafter the material is cooled by air. The surface hardness of the tapered roller 30 becomes preferably 63 to 69HRC, which is almost the same as the surface hardness of the inner ring 10.

Note that while, in this embodiment, the bearing steel is used for the tapered roller 30, as with the inner ring 10, the case hardened steel may be used, and in this case, by giving the aforesaid heat treatment to the material, a tapered roller 30 is made so that surface hardness and surface retained austenite amount are 63 to 69HRC and 13 wt % or larger and smaller than 25 wt %, respectively.

As to the outer ring 20, a heat treatment is given to a material which is formed into a predetermined shape using the aforesaid case hardened steel under conditions described below. Namely, an ordinary carburizing and quenching treatment and a proper tempering treatment are given in this order. The ordinary carburizing and quenching treatment is given such that the material is held at 930° C. for 5 hours for carburizing, and thereafter the material is cooled down to 850° C. and is then held for 0.5 hour for quenching, and the proper tempering treatment is given such that the material is held at 180° C. for 2 hours and is then cooled by air. In this case, the surface hardness and surface retained austenite amount of the outer ring 20 become 61 to 62HRC and on the order 25 to 30 wt %, respectively.

In addition, also in the outer ring 20, the same heat treatment as that given to the inner ring 10 may be given to the outer ring 20, so that a surface hardness of 63 to 69HRC and a surface retained austenite of 13 wt % or larger and smaller than 25 wt % are provided for the outer ring 20. In this case, the reduction in life of the tapered roller bearing can be prevented more effectively.

As one of characteristic configurations of the invention, crownings are applied to the raceway surfaces 11, 21 of the inner and outer rings 10, 20 and the rolling contact surfaces 31 of the tapered rollers 30 which are heat treated in the manners described above to be adjusted to have the predetermined surface hardness and surface retained austenite amount.

Figure 6A:
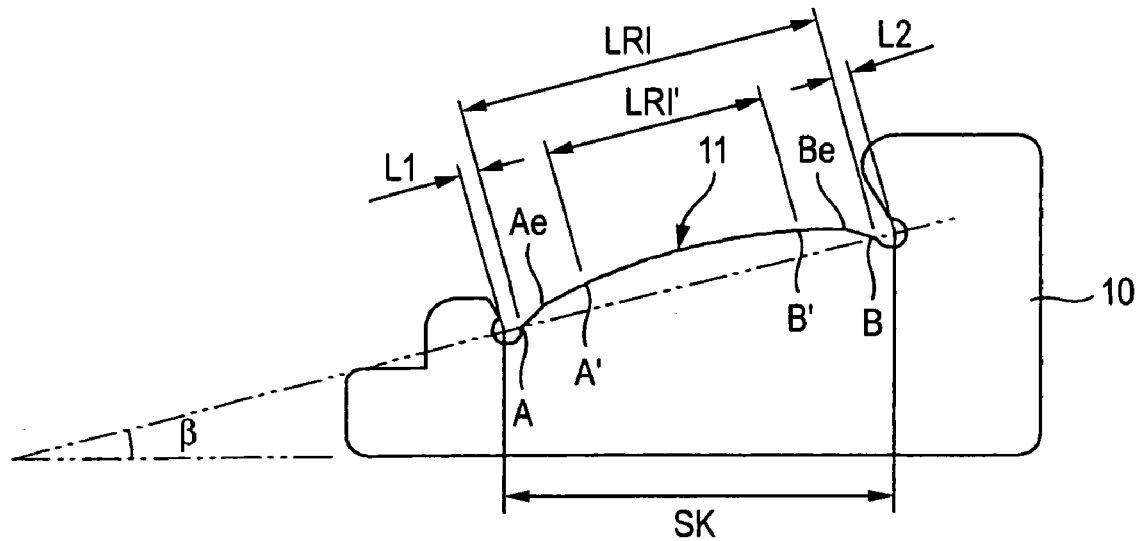

Here, a general concept of crowning will be described by taking the inner ring as an example. FIG. 6A is a diagram showing exaggeratedly a contour of an axial section of the inner ring 10 of which the inner ring raceway surface 11 is crowned. In the figure, a crowning is applied to the inner ring raceway surface 11 which contacts the rolling contact surface 31 of the tapered roller 30 in such a manner as to protrude slightly radially outwards. This crowning shows a composite crowning having a trapezoidal shape in which an arc constitutes an upper side of the trapezoid.

Hereinafter, a calculation method of an crowning amount that is applied to the inner ring 10 (hereinafter, also referred to as an inner ring crowning amount) will be described. In FIG. 6A, when the width of the inner ring raceway surface 11 with respect to the axial direction of the inner ring 10 is SK, a tapered angle of the inner ring raceway surface 11 is $\beta$, and chamfered dimensions shown as formed along both edge portions of the inner ring raceway surface 11 are L1, L2, a raceway length LRI is obtained by the following equation (1):

$$LRI = SK/\cos \beta - (L1+L2) \qquad (1)$$

Here, a length LRI' is defined from a center point of the raceway length LRI as shown in the figure in such a manner that LRI'=0.6LRI, and points on the inner ring raceway surface 11 which correspond to ends of the dimension LRI' are represented by A' and B', respectively. Note that while, in this case, A', B' reside inwards of end points Ae, Be of the arc, respectively, A', B' may coincide with the end points Ae, Be of the arc, respectively.

Figure 6B:
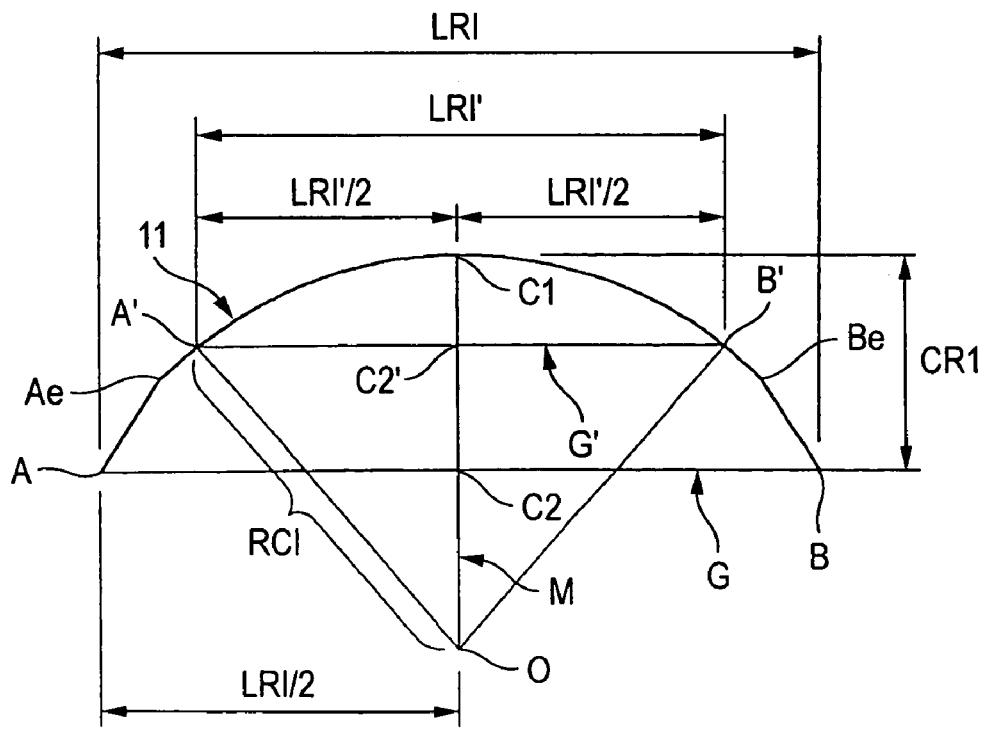

FIG. 6B is a diagram which shows exemplarily a section of the crowning between an end point A and an end point B of the raceway length LRI of the inner ring raceway surface 11 shown in FIG. 6A. In FIG. 6B, a straight line M which passes through a center point C2' of a chord G' of the crowning at the length LRI' and a center O of the arc of the crowning intersects the chord G' at right angles and passes through a central point C1 of the arc of the crowning at the length LRI'. A distance dimension from the central point C1 of the arc of the crowning to a middle point C2 of a chord G of the crowning at the raceway length LRI is represented by the crowning amount CRI of the inner ring 10.

Note that the shape of the inner ring crowning is not limited to the trapezoidal shape in which the arc constitutes the upper side as shown in FIGS. 6A and 6B, and hence, a crowning shape of every kind may be adopted which includes a shape made up of a single arc, a shape made up of a plurality of arcs, a logarithmic crowning, an oval crowning and the like, and the aforesaid concept of the crowning amount can be applied to all those crowning shapes.

The concept of crowning can be applied to the rollers and the outer ring, as well. Furthermore, the definition of the crowning amount can be applied to the rollers and the outer ring.

Note that a crowning made up of a combination of a plurality of shapes within the range of the raceway length (the raceway surface length) is referred to as a composite crowning, and a crowning made up of a single arc shape within the range of the raceway length is referred to as a full crowning.

Next, the concept of crowning and the concept of the crowning amount when a applied crowning is the full crowning will be described. At the same time, the concept of crowning for the tapered roller and the outer ring will also be described.

Figure 7A:
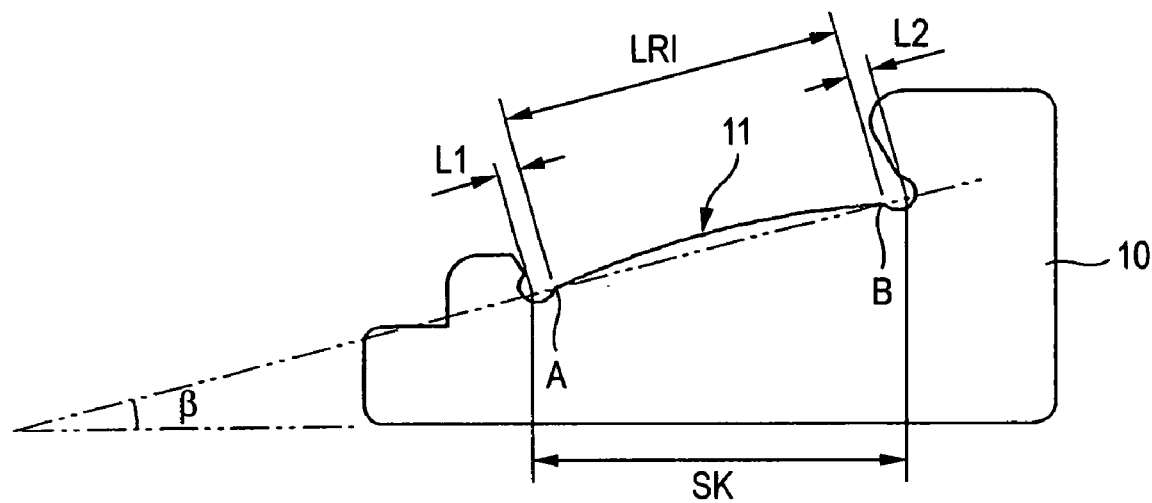

FIG. 7A is a diagram showing a contour of an axial section of the inner ring 10 in which a full crowning is applied to the inner ring raceway surface 11 thereof. In the figure, a raceway length LRI is obtained by the same equation as that used to obtain the LRI of the raceway shown in FIG. 6A:

$$LRI = SK/\cos \beta - (L1+L2)$$

Figure 7B:
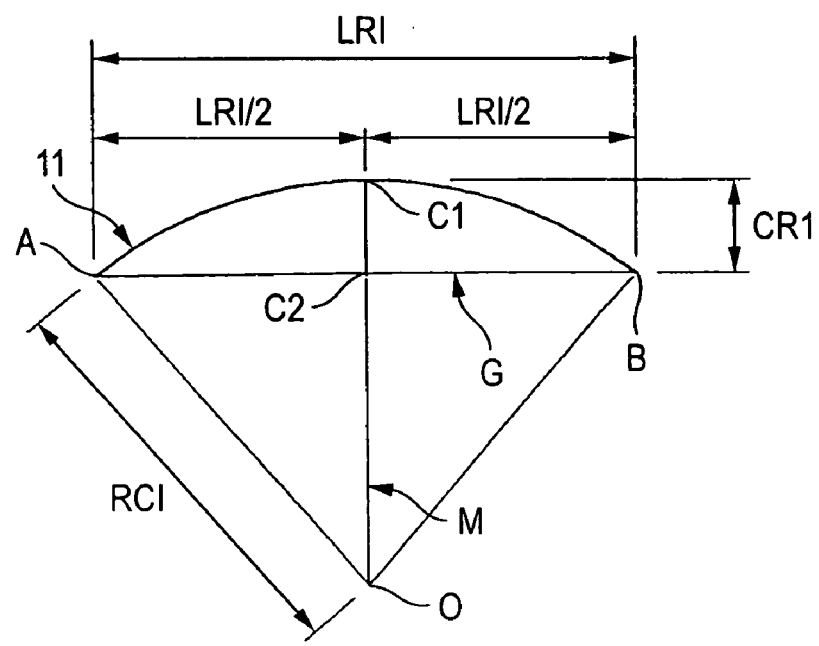

On the other hand, FIG. 7B is a diagram which shows exemplarily a section of the crowning between an end point A and an end point B of the raceway length LRI of the inner ring raceway surface 11 shown in FIG. 7A. In the figure, a straight line M which passes through a middle point C2 of a chord G of the crowning at the length LRI and a center O of an arc of the crowning intersects the chord G at right angles and passes through a central point C1 of the arc of the crowning at the length LRI. A distance dimension defined by the central point C1 of the arc of the crowning and the middle point C2 is represented by an inner ring crowning amount CRI. Namely, assuming that the radius of the crowning arc is RCI as shown in the figure, the inner ring crowning amount CRI is obtained by the following equation (2):

$$CRI = RCI - \{RCI^2 - (LRI/2)^2\}^{1/2} \qquad (2)$$

Figure 8A:
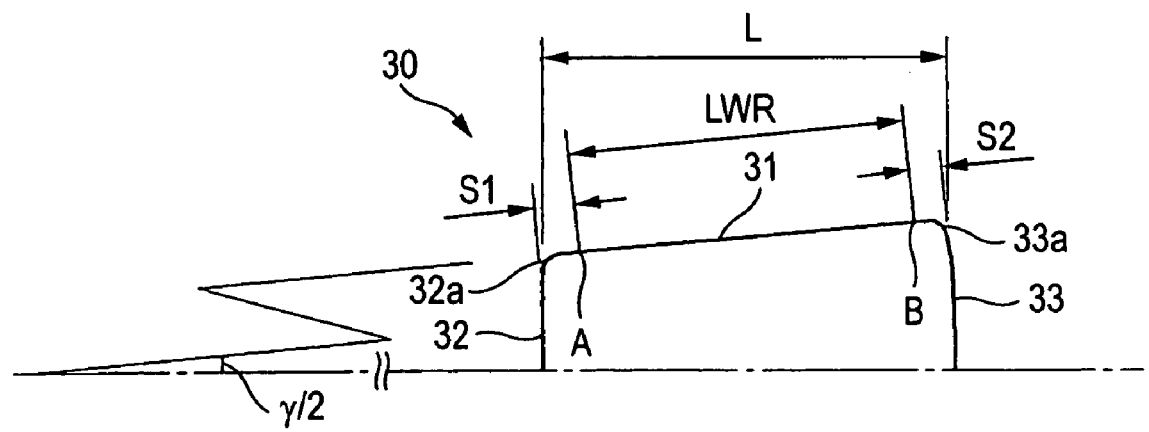

FIG. 8A is a diagram showing a contour of an upper half of an axial section of the tapered roller 30. In the figure, a rolling contact surface 31 is provided on the tapered roller 30 which is brought into rolling contact with the raceway surfaces 11, 21 of the inner and outer rings. Chamfered portions 32a, 33a are provided at both end portions of the rolling contact surface 31, respectively, and the chamfered portions are formed in such a manner as to continue to a small end face 32 which is an end face of a small diameter side of the tapered roller 30 and the large end face 33, respectively, in a smooth fashion. A full crowning is applied to the rolling contact surface 31 in such a manner as to protrude slightly radially outwards.

A method of calculating an amount of crowning applied to the tapered roller 30 (hereinafter, also referred to as a roller crowning amount) will be described hereinafter. In FIG. 8A, assuming that a roller length, which is a width of the rolling contact surface 31 with respect to a center axis direction of the tapered roller 30, is L, a tapered angle of the rolling contact surface 31 is $\gamma$, and width dimensions over which curved surfaces of the chamfered portions 32a, 33a which are formed at both the end portions of the rolling contact surface 31 are removed from a total width of the rolling contact surface are S1, S2, the aforesaid roller effective length LWR of the tapered roller is obtained by the following equation (3):

$$LWR = L/\cos(\gamma/2) - (S1+S2) \qquad (3)$$

Note that constant values are determined for S1, S2 in the equation depending on the size of a bearing.

Figure 8B:
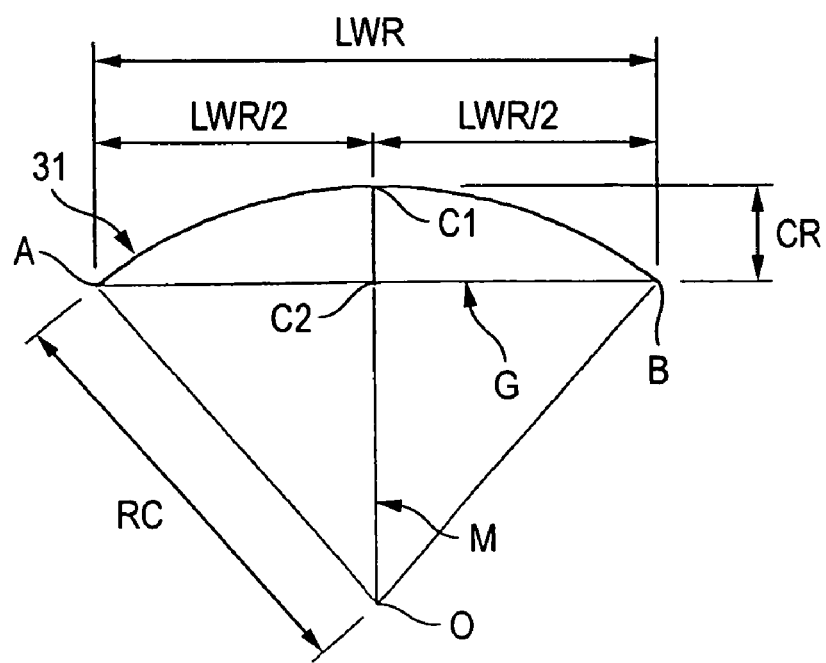

FIG. 8B is a diagram which shows exemplarily the shape of the crowning between an end point A and an end point B of the roller effective length LWR of the rolling contact surface 31 shown in FIG. 8A. In the figure, a straight line M which passes through a middle point C2 of a chord G of the crowning at the roller effective length LWR and a center O of an arc of the crowning intersects the chord G at right angles and passes through a central point C1 of the arc of the crowning at the roller effective length LWR.

In this specification, a distance dimension between the crowning arc central point C1 and the middle point C2 is represented by a crowning amount CR. Assuming that the radius of the crowning arc is RC as shown in the figure, the roller crowning amount CR is obtained by the following equation (4):

$$CR = RC - \{RC^2 - (LWR/2)^2\}^{1/2} \qquad (4)$$

Figure 9A:
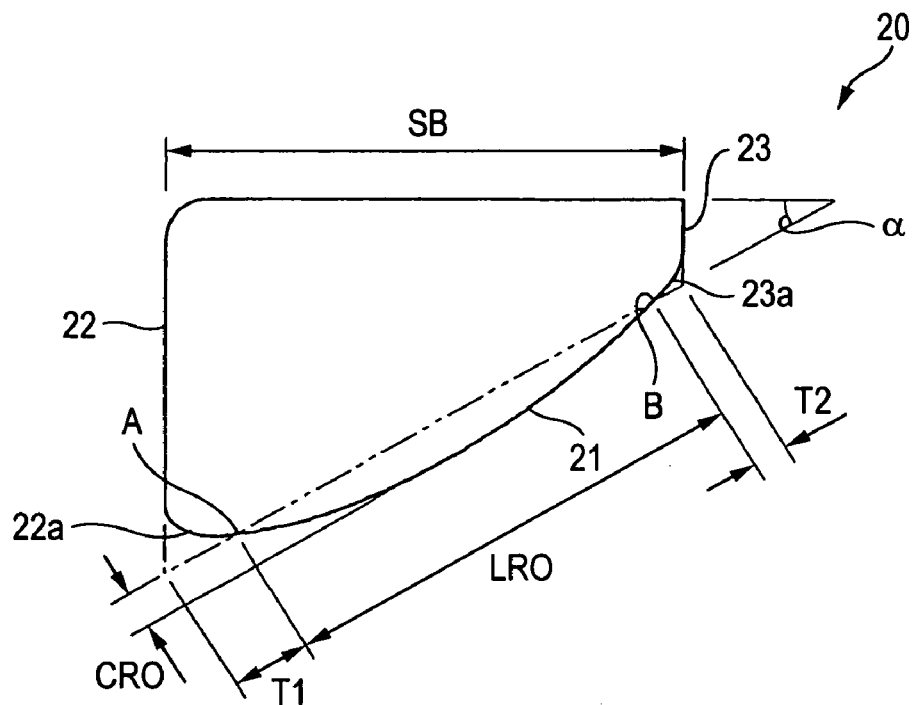

Next, a method of calculating an crowning amount applied to the outer ring 20 in which a full crowning is applied to the raceway surface thereof (hereinafter, also referred to as an outer ring crowning amount) will be described. FIG. 9A is a diagram which shows exaggeratedly a contour of an axial section of the outer ring 20 in which a full crowning is applied to the outer ring raceway surface 21. In the figure, a crowning having a radially inwardly projecting arc-shaped section is applied to the outer ring raceway surface 21 which is brought into rolling contact with the rolling contact surface 31 of the tapered roller 30. Chamfered portions 22a, 23a are provided from both end portions towards axial end faces thereof, respectively. These chamfered portions 22a, 23a are formed in such a manner as to continue to a small inside diameter side end face 22 and a large inside diameter side end face 23, respectively, in a smooth fashion.

In FIG. 9A, assuming that a width of the outer ring raceway surface 21 with respect to an axial direction of the outer ring 20 is SB, a tapered angle of the outer ring raceway surface 21 is α, and width dimensions over which curved surfaces of the chamfered portions 22a, 23a which are formed at both the end portions of the outer ring raceway surface 21 are removed from a total width of the outer ring raceway surface are T1, T2, the aforesaid raceway length LRO is obtained by the following equation (5):

$$LRO = SB/\cos\alpha - (T1+T2) \quad (5)$$

Note that constant values are determined for T1, T2 in the equation depending on the size of a bearing.

Figure 9B:
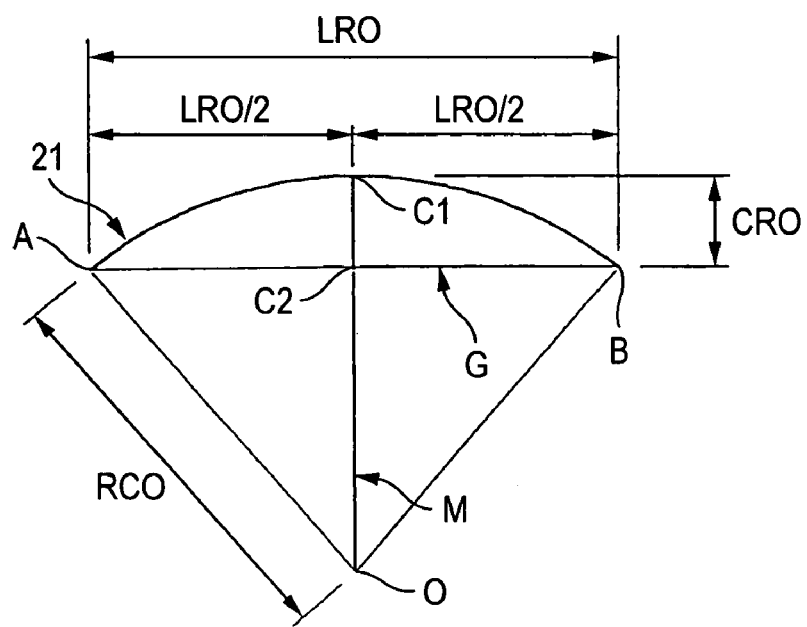

FIG. 9B is a diagram which shows exemplarily the shape of the crowning between an end point A and an end point B of the raceway length LRO of the outer ring raceway surface 21 shown in FIG. 9A. In the figure, a straight line M which passes through a middle point C2 of a chord G of the crowning at the raceway length LRO and a center O of an arc of the crowning intersects the chord G at right angles and passes through a central point C1 of the arc of the crowning at the raceway length LRO.

In this specification, a distance dimension between the crowning arc central point C1 and the middle point C2 is defined as a crowning amount CRO. Assuming that the radius of the crowning arc is RCO as shown in the figure, the outer ring crowning amount CRO is obtained by the following equation (6):

$$CRO = RCO - \{RCO^2 - (LRO/2)^2\}^{1/2} \quad (6)$$

The crowning amounts of the tapered roller and the inner and outer rings when the full crownings are applied thereto can be obtained in the ways described above.

Note that crowning amounts can, of course, be calculated based on the general concept of crowning that has been described before for the tapered roller 30 and the inner and outer rings 10, 20 to which the full crownings are applied. Namely, similar to the case where the length LRI' is obtained in FIGS. 6A and 6B, an LWR' with respect to the LWR for the tapered roller 30 and an LRO' with respect to the LRO for the outer ring 20 may be obtained. The crowning amounts obtained based on the general concept of crowning in this way substantially coincide with the values obtained based on the concept of full crowning (FIGS. 8A to 9B).

In this specification, a total crowning amount, an outer ring crowning rate, a roller crowning rate and an inner ring crowning rate are calculated from the aforesaid the roller crowning amount, the inner ring crowning amount and the outer ring crowning amount based on the following equations (7), (8), (9), (10):

$$\text{Total crowning amount} = \text{outer ring crowning amount} + \text{inner ring crowning amount} + \text{roller crowning amount} \times 2 \quad (7)$$

$$\text{Outer ring crowning rate} = \text{outer ring crowning amount/total crowning amount} \quad (8)$$

$$\text{Roller crowning rate} = (\text{roller crowning amount} \times 2)/\text{total crowning amount} \quad (9)$$

$$\text{Inner ring crowning rate} = \text{inner ring crowning amount/total crowning amount} \quad (10)$$

The tapered roller bearing of this embodiment is such that the running torque is reduced while the reduction in the bearing life thereof is suppressed by controlling the total crowning amount, the outer ring crowning rate, and the roller crowning rate, and the results of an investigation test will be described below which was carried out to clarify the relationship between values of the total crowning amount and the crowning rates and the running torque.

As tapered roller bearings used in this test, a number of tapered roller bearings (such as to correspond to JIS30306) having the configuration shown in FIG. 1 were prepared which were set such that their total crowning amounts and respective crowning rates differed, and running torques of the tapered roller bearings so prepared were measured experimentally.

As a method of measuring running torques of the tapered roller bearings, for example, a bearing testing apparatus was used, and after the tapered roller bearings according to the embodiment were each set on the testing apparatus, one of the inner and outer rings was rotated to measure a running torque acting on the other of the inner and outer rings. As testing conditions, gear oil for differentials was used as a lubricant, an axial load of 4 kN was applied as a dummy load for preload, and two rotational speeds, 300 rpm and 2000 rpm, were used. Running torques which would result in an actually used state are measured.

As a lubricating condition for the test, when the rotational speed of 300 rpm was used, the lubricant at the normal temperature was only applied before the test, and thereafter no lubricant was applied during the test. On the other hand, when the rotational speed of 2000 rpm was used, the lubricant at an oil temperature of 323K (50° C.) was supplied in circulation in an amount of 0.5 liter per minute during the test. The reason the different methods of supplying the lubricant were used according to the rotational speeds used was that only a required minimum amount of the lubricant for each of the rotational speeds was made to be supplied so as to eliminate the possibility of being affected by resistance to stirring which would be produced when the lubricant is supplied excessively to thereby extract a running torque produced by rolling friction.

A running torque was measured on each of the tapered roller bearings in which the total crowning amounts and respective crowning rates were set to different values. Then, a range of values which reduce running torque was specified by grasping a relationship between the total crowning amount and respective crowning rates, and the running torque.

Figure 10:
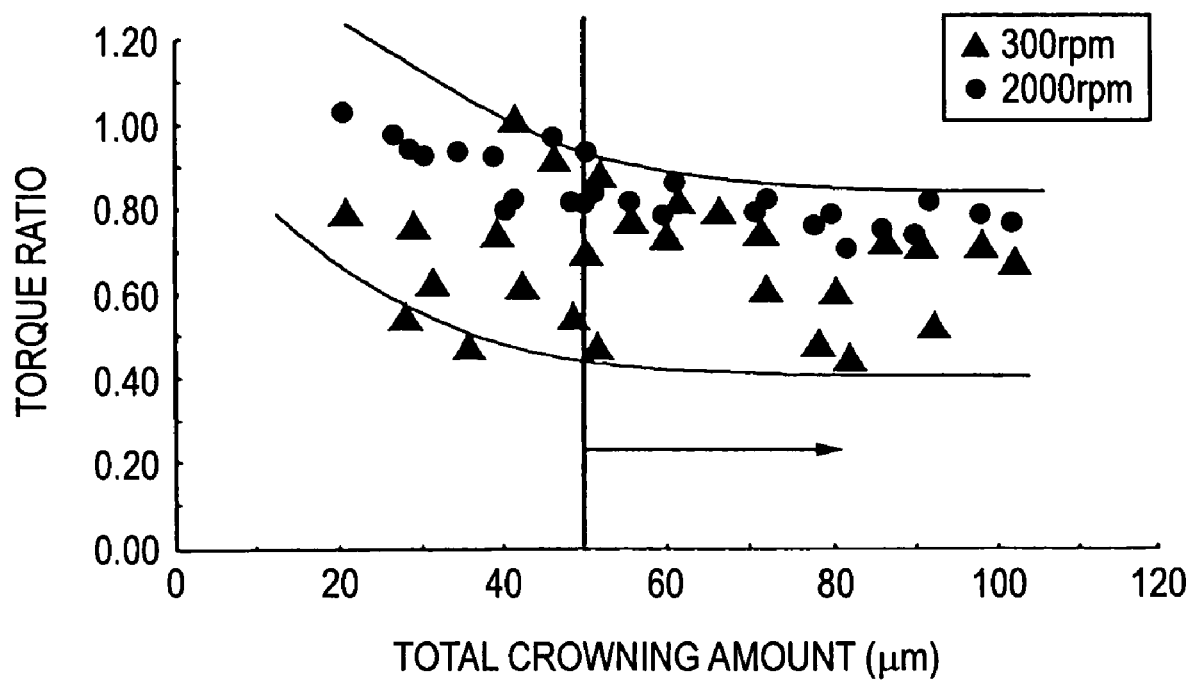
FIG. 10 is a scatter diagram showing a relationship between a total crowning amount and a torque ratio of the tapered roller bearing.

FIG. 10 is a scatter diagram showing the relationship between the total crowning amount and a torque ratio (a running torque/a predetermined value) of the tapered roller bearings on which measurements were carried out. As is clear from the diagram, while the torque ratio scatters over a wide width when the total crowning amount is 50 μm or smaller, there is shown a tendency in which a maximum value of the torque ratio so scattering gradually decreases as the total crowning amount increases. When the total crowning amount is 50 µm or larger, it is seen that the torque ratio is stably distributed within a range of lower values, compared to the case where the total crowning amount is 50 µm or smaller.

When the total crowning amount exceeds 100 µm, excessive crownings are applied to the tapered roller and the inner and outer rings, leading to a risk that the tapered roller does not roll in a stable fashion. Consequently, the total crowning amount is preferably 100 µm or smaller.

Figure 11:
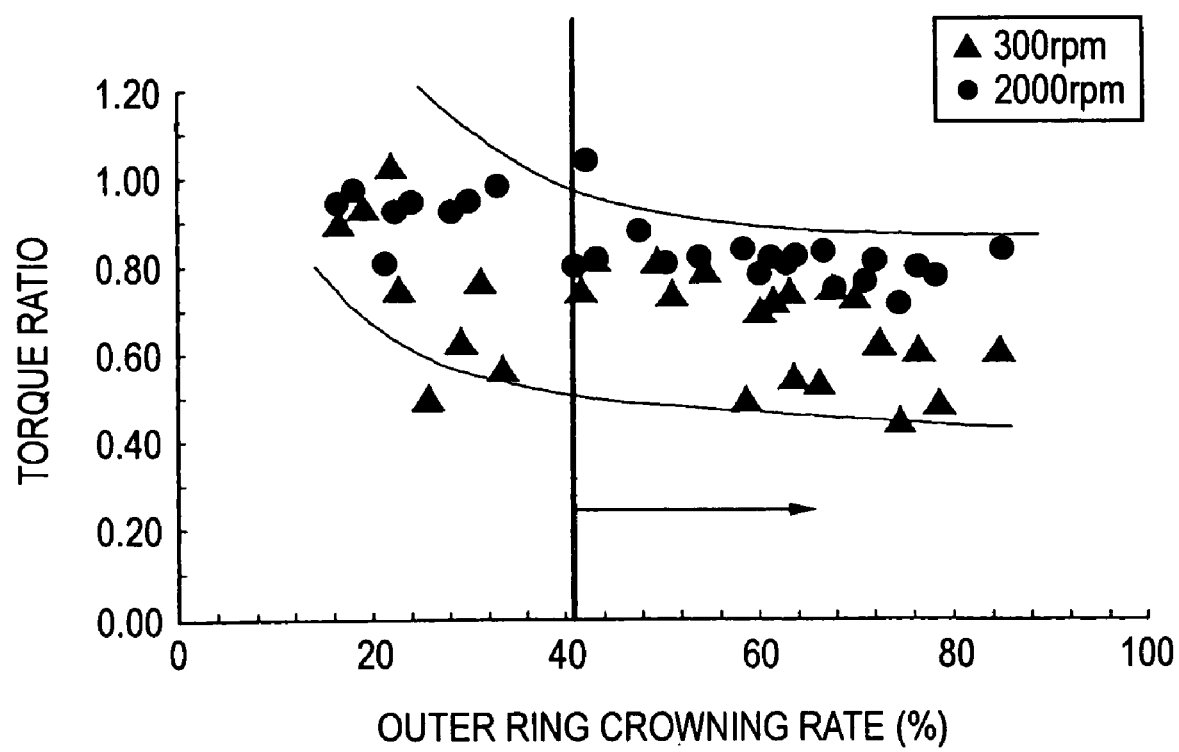
FIG. 11 is a scatter diagram showing a relationship between an outer ring crowning rate and the torque ratio of the tapered roller bearing.

Next, FIG. 11 is a scatter diagram showing the relationship between the outer ring crowning rate and the torque ratio of the tapered roller bearings. As is clear from the diagram, when the outer ring crowning rate is 40% or smaller, a maximum value of the torque ratio gradually decreases as the outer ring crowning rate increases. When the outer ring crowning rate is 40% or larger, it is seen that the torque ratio is stably distributed within a range of lower values, compared to the case where the outer crowning rate is 40% or smaller.

Figure 12:
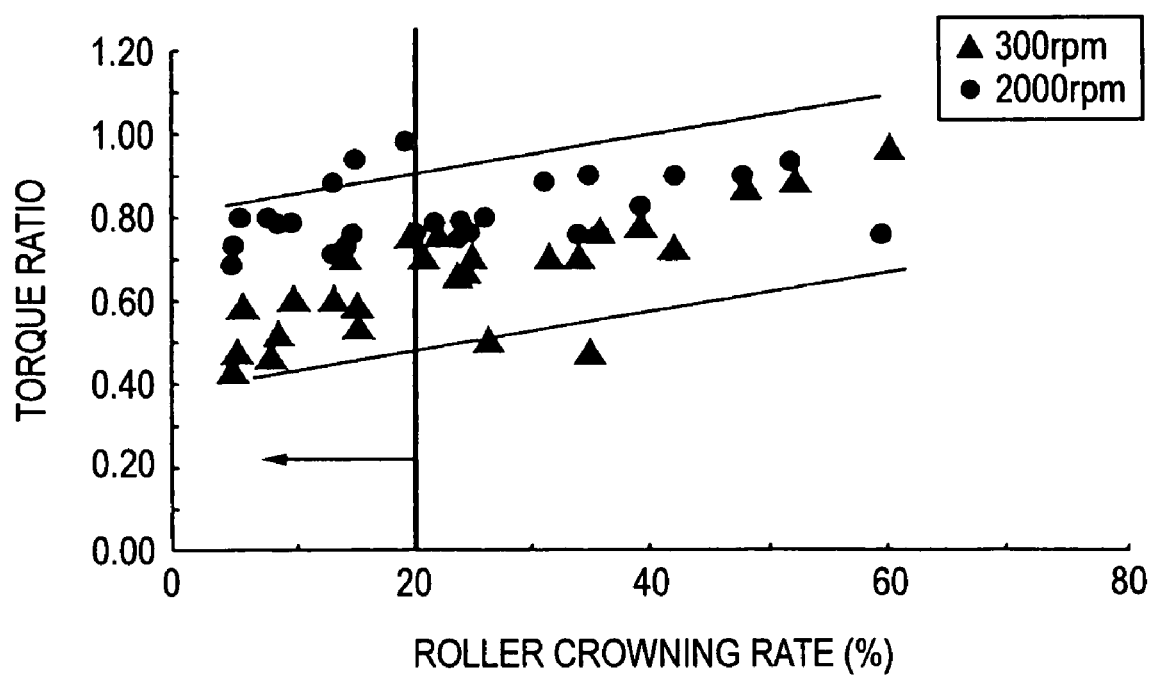
FIG. 12 is a scatter diagram showing a relationship between a roller crowning rate and the torque ratio of the tapered roller bearing.

FIG. 12 is a scatter diagram showing the relationship between the roller crowning rate and the torque ratio of the tapered roller bearings. As is clear from the diagram, when the roller crowning rate is 20% or larger, a maximum value of the torque ratio gradually decreases as the roller crowning rate reduces. When the roller crowning rate is 20% or smaller, it is seen that the torque ratio is stably distributed within a range of smaller values compared to the case where the roller crowning rate is 20% or larger.

Figure 13:
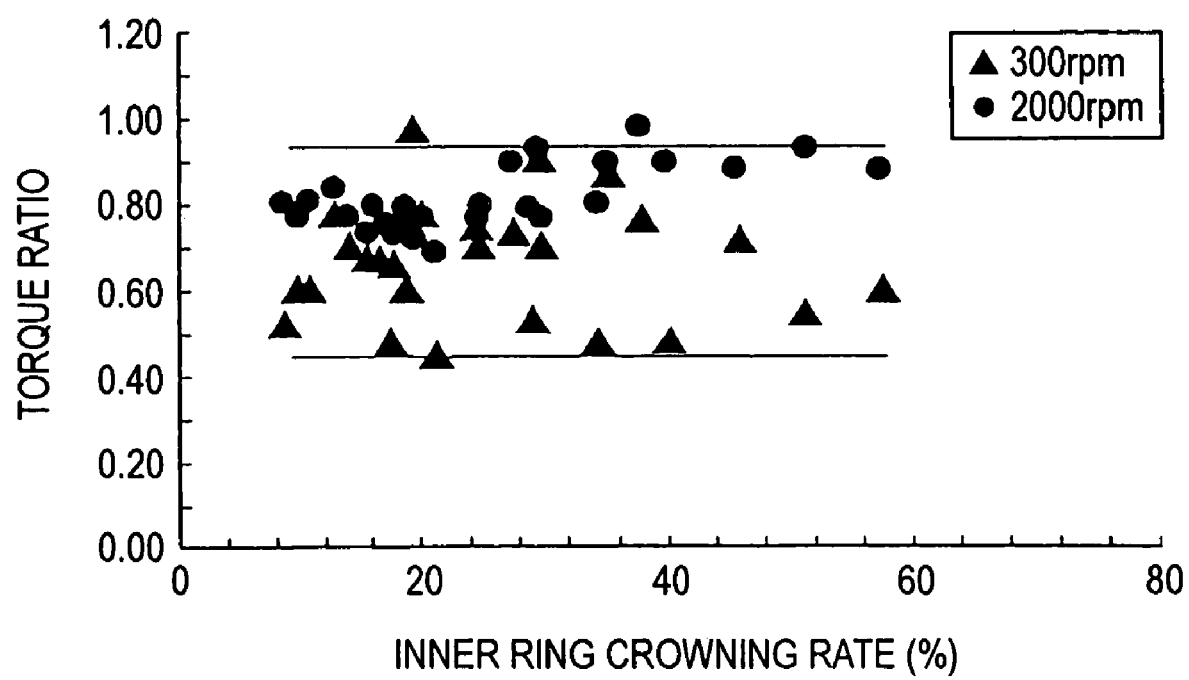
FIG. 13 is a scatter diagram showing a relationship between an inner ring crowning rate and the torque ratio of the tapered roller bearing.

FIG. 13 is a scatter diagram showing the relationship between the inner ring crowning rate and the torque ratio of the tapered roller bearings. As is clear from the diagram, the torque ratio is stable within a substantially constant range as the inner crowning rate varies. Namely, no remarkable correlation with respect to the torque ratio of the tapered roller bearings was identified. However, contact loads produced in the vicinity of axial end portions of the contact surface between the inner ring raceway surface 11 and the rolling contact surface 31 can be reduced by setting the inner ring crowning rate to 10% or larger, whereby, even in the event that a so-called edge load is applied, the effect of the edge load can be reduced, so as to prevent the reduction in service life of the tapered roller bearing.

As has been described heretofore, as a result of experimental measurements and study on the relationship between the running torque ratio of the tapered roller bearings, that is, the running torques in the actually utilized state of the tapered roller bearings, and the total crowning amount and the respective crowning rates, a view could be obtained that the running torque in the actually utilized state of the tapered roller bearings can be reduced by satisfying the conditions that the total crowning amount is 50 µm or larger, the outer ring crowning rate is 40% or larger and the roller crowning rate is 20% or smaller.

While the outer ring crowning rate may be 100%, when considering the fact that the inner ring crowning is applied by 10% or larger as has been described above, the outer ring crowning rate is preferably 90% or smaller.

Further, in the event that the roller crowning rate is 0%, with the outer ring crowning rate and the inner ring crowning rate staying within the aforesaid predetermined ranges, the effect of reducing the running torque can be obtained. Consequently, the roller crowning rate may only have to be set in a range from 0% or larger to 20% or smaller.

Since the outer ring is crowned to realize an outer ring crowning rate of 40% or larger, the inner ring crowning rate is preferably 60% or smaller.

The running torques of the tapered roller bearings measured in the aforesaid investigation test are those measured in the state where the effect of the resistance to stirring of the lubricant was eliminated as much as possible and are running torques that were affected largely by the rolling viscous resistance between the tapered rollers and the inner and outer rings.

Namely, according to the results of the investigation test, it is understood that the rolling viscous resistance between the inner and outer rings and the tapered rollers is reduced by setting the total crowning amount of the crownings applied to the rolling contact surface of the tapered roller 30 and the raceway surfaces of the inner and outer rings, the outer ring crowning rate and the roller crowning rate to the aforesaid conditions.

That is, according to the tapered roller bearing 1 according to the embodiment, as has been described above, the rolling viscous resistance between the tapered rollers 30 and the inner and outer rings 10, 20 can be reduced, and the rolling friction therebetween can be reduced. As a result, the running torque as of the tapered roller bearing 1 can be reduced.

In particular, in the automotive pinion shaft supporting apparatus in the differential, since bearings used therein are lubricated by a gear lubricant having a relatively high viscosity, the rolling viscous resistance of the bearings tends to be increased. Consequently, by using the tapered roller bearing according to the invention in the automotive pinion shaft supporting apparatus, the effect of running torque reduction thereby becomes remarkable.

In addition, in order to investigate the running torque reduction effect of the tapered roller bearing based on the individual conditions with respect to the crownings, the following comparison was made. Namely, the tapered roller bearing of this embodiment which fulfills the above conditions (the total crowning rate is 64 µm, the outer ring crowning amount is 40 µm, the roller crowning amount is 2 µm, and the inner crowning amount is 20 µm) and a tapered roller bearing of the same size in which inner and outer rings and tapered rollers are not crowned were prepared, and the running torques of both the tapered roller bearings were measured under the same condition for comparison.

As a result, with the tapered roller bearing of the embodiment, compared to the tapered roller bearing which was not crowned, it could be confirmed that the running torque was reduced by roughly 55% thereof.

In addition, in the tapered roller bearing of the embodiment which fulfills the aforesaid individual conditions, there occasionally occurs a case where the contact bearing pressure between the rolling contact surfaces and the raceway surfaces happens to become 2.8 GPa depending on conditions where the tapered roller bearing is used. On the other hand, in the general tapered roller bearing which was not crowned, the contact bearing pressure is about 2.5 GPa under the same conditions, and thus, the contact bearing pressure of the tapered roller bearing of the embodiment becomes higher than that of the general tapered roller bearing. In the tapered roller bearing of the embodiment, however, even in the event that a high bearing pressure as of 2.8 GPa which results between the rolling contact surfaces and the raceway surfaces is produced, the reduction in the bearing life can be suppressed by setting the surface hardnesses and surface retained austenite amounts of the inner ring and the tapered rollers to the preferred values.

EXAMPLE

Next, the results of a comparison investigation will be described which was carried out on an example of the invention and comparison examples (1, 2) in which specific values were set accordingly. Hereinafter, methods of manufacturing the example of the invention and the comparison examples will be described.

The example of the invention was manufactured in the following manner. A material prepared to SAE5120 was used, and inner and outer ring materials were formed by working the SAE5120 material, the inner and outer ring materials being given a heat treatment under the following conditions. Namely, an ordinary carburizing and quenching treatment, a pre-tempering treatment, a sub-zero treatment and a proper tempering treatment were given in this order. The ordinary carburizing and quenching treatment was given such that the materials were held at 930° C. for 5 hours for carburizing, and thereafter the materials were cooled down to a quenching temperature of 850° C. and were then held for 0.5 hour thereat for quenching, a pre-tempering treatment was given such that the materials were held at 120° C. for 1 hour and were then cooled by air, the sub-zero treatment was given such that the materials were held at −100° C. for 1 hour and were then left to stand, and the proper tempering treatment was given such that the materials were held at 160° C. for 2 hours and were then cooled by air. The inner and outer rings were manufactured in this way.

On the other hand, a material prepared to SUJ2 was used to prepare a material for the tapered rollers, and a heat treatment was given to the material which included an ordinary quenching treatment, a sub-zero treatment and a proper tempering treatment which were carried out in this order. Namely, the ordinary quenching treatment was given such that the material was held at 830° C. for 40 minutes for quenching, the sub-zero treatment was given such that the material was held at −80° C. for 1 hour and was then left to stand, and the proper tempering treatment was given such that the material was held at 160° C. for 2 hours and was then cooled by air, whereby the tapered rollers were manufactured. Then, a tapered roller bearing of the example of the invention was assembled using the inner and outer rings and the tapered rollers which were manufactured in the ways described above.

Next, a method of manufacturing the comparison example 1 will be described. A material prepared to SAE5120 was used, and inner and outer ring materials were formed by working the SAE5120 material, the inner and outer ring materials being given a heat treatment under the following conditions. Namely, an ordinary carburizing and quenching treatment and a proper tempering treatment were given in this order. The ordinary carburizing and quenching treatment was given such that the materials were held at 930° C. for 5 hours for carburizing, and thereafter the materials were cooled down to a quenching temperature of 850° C. and were then held for 0.5 hour thereat for quenching, and the proper tempering treatment was given such that the materials were held at 180° C. for 2 hours and were then cooled by air. The inner and outer rings were manufactured in this way.

On the other hand, a material prepared to SUJ2 was used to prepare a material for the tapered rollers, and a heat treatment was given to the material under the following conditions. Namely, a heat treatment was given to the material which included an ordinary quenching treatment and a proper tempering treatment which were given in this order. The ordinary quenching treatment was given such that the material was held at 830° C. for 30 minutes for quenching, and the proper tempering treatment was given such that the material was held at 180° C. for 2 hours and were then cooled by air. The inner and outer rings and the tapered rollers were manufactured in these ways, and a tapered roller bearing as the comparison example 1 was assembled using the inner and outer rings and the tapered rollers which were manufactured in the ways described above.

Next, a method of manufacturing the comparison example 2 will be described. A material prepared to SUJ2 was used, and materials for inner and outer rings and tapered rollers of a tapered roller bearing were formed by working the SUJ2 material, the materials formed for the inner and outer rings and the tapered rollers being given a heat treatment under the following conditions. Namely, a heat treatment was given to the materials which included an ordinary quenching treatment and a proper tempering treatment which were given in this order. The ordinary quenching treatment was given such that the materials were held at 830° C. for 30 minutes for quenching, and the proper tempering treatment was given such that the materials were held at 180° C. for 2 hours and were then cooled by air. The inner and outer rings and the tapered rollers were manufactured in these ways, and the tapered roller bearing as the comparison example 2 was assembled using the inner and outer rings and the tapered rollers which were manufactured in the ways described above.

Table 1 below shows the results of measurements of the surface hardnesses and surface retained austenite amounts of the inner and outer rings and tapered rollers of the example of the invention, the comparison example 1 and the comparison example 2, which were all manufactured in the ways described above.

TABLE 1

|  | Example of Invention | | | Comparison 1 | | | Comparison 2 | | |
| --- | --- | --- | --- | --- | --- | --- | --- | --- | --- |
|  | I/R | O/R | Roller | I/R | O/R | Roller | I/R | O/R | Roller |
| Quality | SAE5120 | SAE5120 | SUJ2 | SAE5120 | SAE5120 | SUJ2 | SUJ2 | SUJ2 | SUJ2 |
| Surface Hardness | 64.5 | 64.5 | 66 | 62 | 61 | 62 | 62 | 62 | 62 |
| S/Retained Austenite Amount | 18 | 17 | 15 | 30 | 25 | 10 | 10 | 10 | 10 |

Crownings that were applied to the raceway surfaces and rolling contact surfaces of the example of the invention and the comparison examples 1, 2 were set to fulfill the aforesaid conditions (the total crowning rate is 50 μm or larger, the outer ring crowning rate is 40% or larger, the roller crowning rate is 20% or smaller).

Life tests were carried out on the example of the invention and the comparison examples 1, 2 using, as lubricants, a foreign matter contained oil which contained, as foreign matters, 0.03 wt % of quenched steel powder whose surface hardness and particle size were 62HRC and 150 μm or smaller, respectively, in a gear oil having a viscosity of 85W-90 and a clean oil which contained no foreign matters in the same gear oil, and respective life ratios of the examples were investigated based on the life of the comparison example 1 as regarded 1. The results thereof are shown in FIGS. 14A and 14B.

Figure 14A:
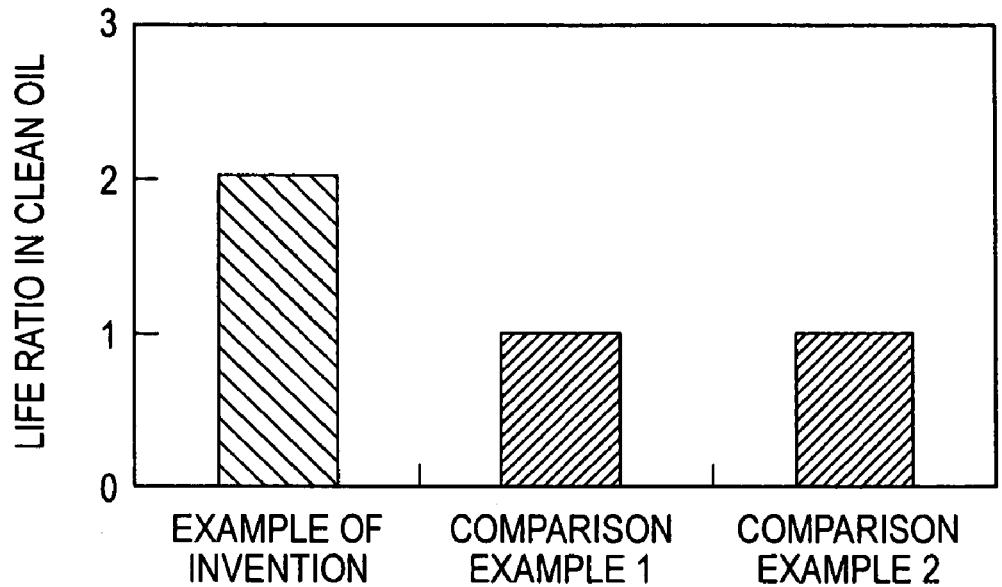
FIGS. 14A and 14B are graphs showing the results of life tests carried out on an example of the invention and comparison examples.
Figure 14B:
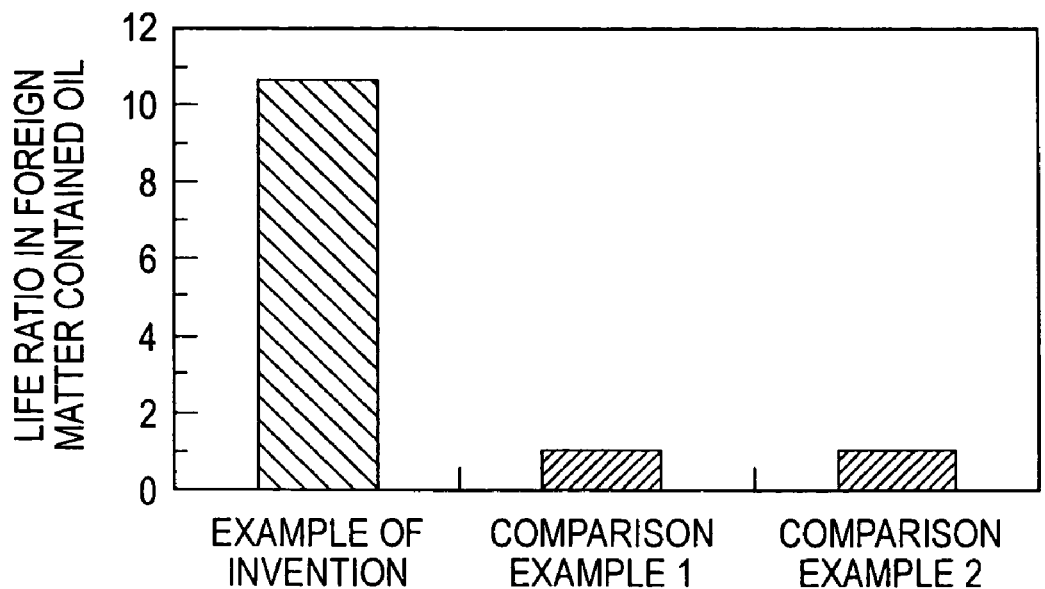

FIG. 14A shows the results of the life test carried out in the clean oil, whereas FIG. 14B shows the results of the life test carried out in the foreign matter contained oil. In FIG. 14A, the life ratio of the example of the invention is about twice those of the comparison examples 1, 2. On the other hand, in FIG. 14B, the life ratio of the example of the invention is about eleven times those of the comparison examples 1, 2. Thus, it is seen that the life ratio of the example of the invention becomes remarkably long in the foreign matter contained oil.

In the examples used in the tests, the rolling contact surfaces and the raceway surfaces are crowned, and the contact bearing pressures therebetween become high. Furthermore, in FIG. 14B, it is considered that the bearing life is remarkably reduced due to the foreign matters being contained in the lubricant. In the example of the invention, however, the reduction in life thereof is suppressed in either of the lubricants, and the reduction in life of the example of the invention is suppressed more effectively, in particular, in the foreign matter contained oil.

Thus, as has been described heretofore, according to the tapered roller bearing of the invention, it could be confirmed that the reduction of life thereof can be suppressed effectively even in the circumstances where the contact bearing pressure between the rolling contact surfaces and the raceway surfaces is high.

Note that the life tests that were carried out on the tapered roller bearings in the ways described above were tests carried out in a state where quenched steel powder was added to a lubricant to reproduce a lubricant in an actually used state which contained minute particles resulting from the wear of gears on the assumption that the tapered roller bearings are incorporated in an automotive pinion shaft supporting apparatus in a differential and a transaxle of a motor vehicle. Consequently, it is obvious that the tapered roller bearing of the invention can suppress effectively the reduction in bearing life thereof in the circumstances where the tapered roller bearing is lubricated by a foreign matter contained lubricant which contains many foreign matters as in the automotive pinion shaft supporting apparatus or the like. From this, the tapered roller bearing of the invention can be preferably used as a rolling bearing in an automotive pinion shaft supporting apparatus having a pinion shaft and rolling bearings which are disposed on a pinion gear side and an opposite side thereto of the pinion shaft to support the pinion shaft, respectively.

What is claimed is:

1. A tapered roller bearing comprising:
   an outer ring that is made of steel material and includes a crowned raceway surface;
   an inner ring that is made of steel material and includes a crowned raceway surface;
   a plurality of tapered rollers that are made of steel material, include crowned rolling contact surfaces and are interposed between the outer ring and the inner ring; and
   a cage for the tapered rollers, wherein
   surface hardnesses of the raceway surface of the inner ring and the rolling contact surfaces of the tapered rollers are 63 to 69HRC, respectively,
   a total crowning amount, which is a sum of outer ring crowning amount, inner ring crowning amount and two times of roller crowning amount, is 50 μm or larger,
   an outer ring crowning rate, which is a rate of the outer ring crowning amount on the total crowning amount, is 40% or larger, and
   a roller crowning rate, which is a rate of two times of the roller crowning amount on the total crowning amount is 20% or smaller.

2. The tapered roller bearing according to claim 1, wherein a surface retained austenite amount in the raceway surface of the inner ring is 13 wt% or larger and smaller than 25 wt%.

3. The tapered roller bearing according to claim 1, wherein carburizing and quenching treatments are applied to the inner ring.

4. An automotive pinion shaft supporting apparatus having a pinion shaft and rolling bearings which are disposed on a pinion gear side and an opposite side thereto of the pinion shaft to support the pinion shaft, respectively, wherein
   at least one of the rolling bearings which are disposed on the pinion gear side and the opposite side thereto of the pinion shaft, respectively, is made up of the tapered roller bearer according to claim 1.

* * * * *